(12) United States Patent
DeMattei

(10) Patent No.: US 9,639,861 B2
(45) Date of Patent: May 2, 2017

(54) MESSAGING WITH GREETING CARD AND GIFT OPTION

(71) Applicant: Mark Anthony DeMattei, Greensboro, GA (US)

(72) Inventor: Mark Anthony DeMattei, Greensboro, GA (US)

(73) Assignee: TEXTSOFT, INC, Athens, GA (US)

( * ) Notice: Subject to any disclaimer, the term of this patent is extended or adjusted under 35 U.S.C. 154(b) by 0 days.

(21) Appl. No.: 14/807,260

(22) Filed: Jul. 23, 2015

(65) Prior Publication Data

US 2015/0324858 A1 Nov. 12, 2015

Related U.S. Application Data

(63) Continuation-in-part of application No. 13/712,252, filed on Dec. 12, 2012, now Pat. No. 9,424,334.

(60) Provisional application No. 61/569,367, filed on Dec. 12, 2011.

(51) Int. Cl.
| | |
|---|---|
| *G06F 17/30* | (2006.01) |
| *G06Q 30/02* | (2012.01) |
| *H04L 12/58* | (2006.01) |
| *H04M 3/42* | (2006.01) |

(52) U.S. Cl.
CPC ....... *G06Q 30/0267* (2013.01); *H04L 51/046* (2013.01); *H04L 51/08* (2013.01); *H04M 3/42382* (2013.01); *H04L 51/063* (2013.01)

(58) Field of Classification Search
CPC .... G06Q 30/02; G06Q 30/0601; G06Q 20/36; G06Q 20/322; G06Q 20/105; G06Q 20/342; G06Q 30/00; G06Q 20/12; G06Q 20/32; G06Q 20/28; G06Q 20/351; G06Q 30/0235; G06Q 10/06311; G06Q 20/3255; G06Q 30/0207; H04L 51/08; H04L 51/046; H04L 51/063; H04L 67/18; H04M 3/42382; G06F 17/30; G06F 17/30386; G06F 17/30528; G06F 17/30867
USPC ........................................ 707/736
See application file for complete search history.

(56) References Cited

U.S. PATENT DOCUMENTS

| | | | |
|---|---|---|---|
| 2006/0085392 A1* | 4/2006 | Wang ............... | G06F 17/3087 |
| 2009/0182663 A1* | 7/2009 | Hurst ............... | G06Q 20/105 |
| | | | 705/41 |
| 2009/0210318 A1* | 8/2009 | Abifaker ........... | G06Q 20/10 |
| | | | 705/26.1 |
| 2010/0159883 A1* | 6/2010 | Pascal .............. | H04L 12/581 |
| | | | 455/412.1 |
| 2010/0318423 A1* | 12/2010 | Kanigsberg ....... | G06F 17/30867 |
| | | | 705/14.53 |
| 2011/0106698 A1* | 5/2011 | Isaacson ........... | G06Q 20/105 |
| | | | 705/41 |
| 2011/0225539 A1* | 9/2011 | Lee ................. | G06F 3/0485 |
| | | | 715/784 |

\* cited by examiner

*Primary Examiner* — Evan Aspinwall
(74) *Attorney, Agent, or Firm* — Smith Tempel Blaha LLC; Gregory Scott Smith

(57) ABSTRACT

A messaging solution that provides for creating and embedding gift cards into a text message or multi-media message. The inclusion of the gift card may be invoked when a user is sending a greeting card or, a user may directly invoke the sending of a gift card, or similarly a subscription.

15 Claims, 18 Drawing Sheets

MESSAGING WITH GREETING CARD AND GIFT OPTION

BACKGROUND

The invention relates to the enhancement of text messages and multi-media text message by the inclusion of an option to invoke an electronic commerce transaction to purchase a gift card. Thus, the enhancement could be deployed within a system that provides for text messaging or instant messaging over mobile devices; and, more particularly, within a system and method for decoding and/or encoding such messages to determine key words therein and select video and/or audio content relating to the key words and transmitting the selected content to the recipient of the text message.

The advent of wireless devices has had a revolutionary impact on the way we communicate. In the pre-cellular world, communication was dominated by face-to-face, postal or telephone communications. However, having entered into the cellular age, one could argue that the dominant form of communication, especially on the thirty year old and younger crowd is through text messaging and instant messaging. Generally, the sender types a message into the device and sends it to the intended recipient. However, as data bandwidths have increased through the migration of cellular service, the richness of the content deliverable through the cellular network has also greatly increased. This technology migration has given rise to a variety of novel inventions that could not have been implemented absent the migration of the technology. The various inventions presented within the context of this application are similarly enabled due to the migration of cellular technology.

The use of text messaging as a form of communication, as previously mentioned, is a dominant form of communication. However, the use of text alone, especially in scenarios in which the number of characters is limited, can have a significant squelching on the effectiveness of the communication. As such, innovative people began utilizing clever character arrangements to convey emotion. For instance, the colon and closed parenthesis characters have been used to convey a smiling face ":)". Further, the use of the colon and the open parenthesis has been used to convey a frowning face ":(". These characters, included within a text message can then convey emotions such as the sender is happy, the sender is teasing, the sender is angry, the sender is sad, etc. Character formations such as this have become known as emoticons. Many other variations have also been introduced. This technology then migrated to the use of graphic images, which are able to convey a large variety of emotions, messages, etc. The present disclosure builds upon this technology, which has proven to be a viable and growing need in the art.

BRIEF SUMMARY

Various embodiments of a messaging application are presented herein along with various features and aspects thereof. In general, a messaging application running on a platform, such as a smart phone, is enhanced with the ability to include multi-media content that is searched for and presented as available to the user based on certain triggers, such as the actual content or keywords of the message. The multi-media content may include a gift card or, in addition to the multi-media content, the user may be presented with the option to select and send a gift card. More specifically, some embodiments comprise an application that is executed on a smart phone platform. The application operates to present a window on the display of the smart phone. The window includes functionality for the entering, transmission, receiving and display of messages between a sender and a recipient. Further, the application identifies a trigger, such as key words within content within a text passage, which may typically be at least a portion of one or more of the messages between the sender and the recipient. The application then conducts a search for multi-media content related to the Trigger. The search may include internal files, a database of files, external files, etc.

Once one or more multimedia contents are discovered, the content is presented on a user interface of the smart phone such that a particular multi-media content item can be selected. The multi media content item may be a video, audio, slide show, etc. as well as a greeting card or gift card. Thus, in some embodiments a gift card may be selected directly while in other embodiments the gift card may be selected after selection of a greeting card.

In this latter embodiment, the application receives a selection of a greeting card multi-media content item and in response, the application includes an access element within the content of a message to be transmitted. The access element is related to the selected greeting item. The application then presents an option for the sender to include a gift card with the greeting card. The application receives a selection of a gift card request. Further, the application may receive the identification of a value to be associated with the gift card or, it may default to a specific value. In addition, the application may receive a selection of a merchant for the gift card or it may default to a specific merchant or select a merchant based on triggers. Finally, the message along with the greeting card and the gift certificate to transmitted to the recipient.

DETAILED DESCRIPTION OF VARIOUS EMBODIMENTS

The present disclosure presents various embodiments, as well as features and aspects thereof, and is directed towards providing a solution to deliver media enriched messages with options to purchase gift cards through invoking of electronic commerce transactions made available through the message.

More specification, embodiments of the gift card embedded messaging techniques contemplate a computer implemented system (FIG. 8) that can accept a request from a first mobile device for a text message or instant message that is accompanied with an embedded content items, such as an audio and/or video recording, graphic, greeting card, etc., associated with a trigger within the content of the text message or messages. The trigger may be identified by looking at a single message to be transmitted, a single message received or a series of received, transmitted and/or to be transmitted messages. The trigger may consist of at least one word or a plurality of words that are inputted in the text message or instant message as a non-limiting example. However, the trigger may also include other information such as the gist of a message, the time of day, the day of the week, the location of the mobile device onto which the message is being entered or read, weather, current events, etc. A text messaging or instant messaging user interface is preprogrammed to select content, such as recordings, from a group of content associated with the trigger, such as a specified word or plurality of words of the text message or instant message as a non-limiting example, from an appropriate list of content, such as audio and/or video recordings as a non-limiting example, stored on a remote server, the internet, the cloud, in memory within the wireless device or in any storage location containing a plurality of audio recordings and/or video recordings that may be accessible by a wireless device. This content, such as multimedia content, audio and/or video recordings, etc., are retrieved based on the trigger (i.e. a key word or key words input within the body of the text message originating from the first mobile device user's text messaging interface as a non-limiting example). If the second, or group of mobile device users, have the system installed on their wireless device, they may also respond back to the first users wireless device using the same interface.

Figure 8:
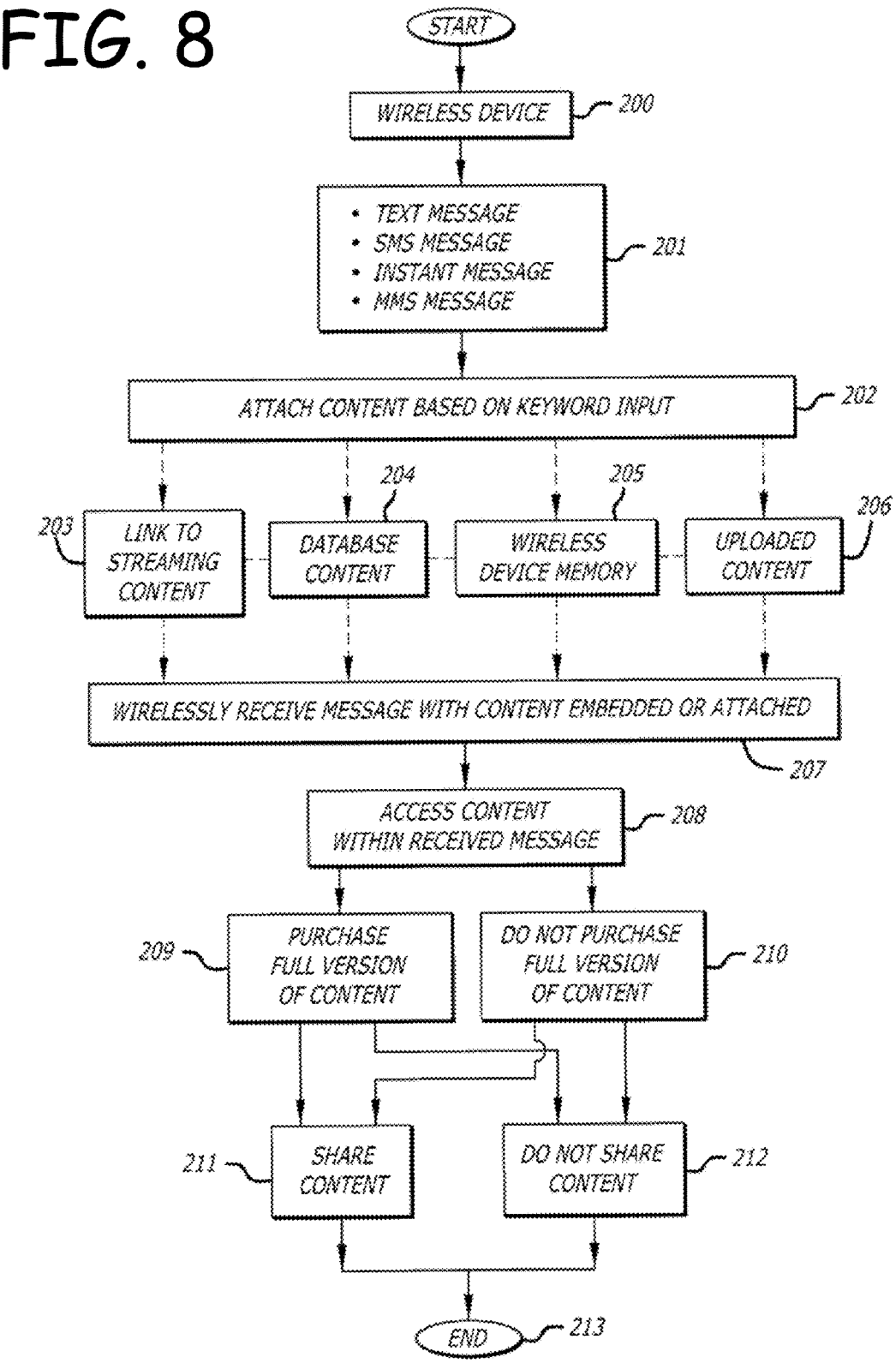
FIG. 8 is an illustration schematic block diagram of an alternative embodiment of the system of FIG. 1.
Figure 9:
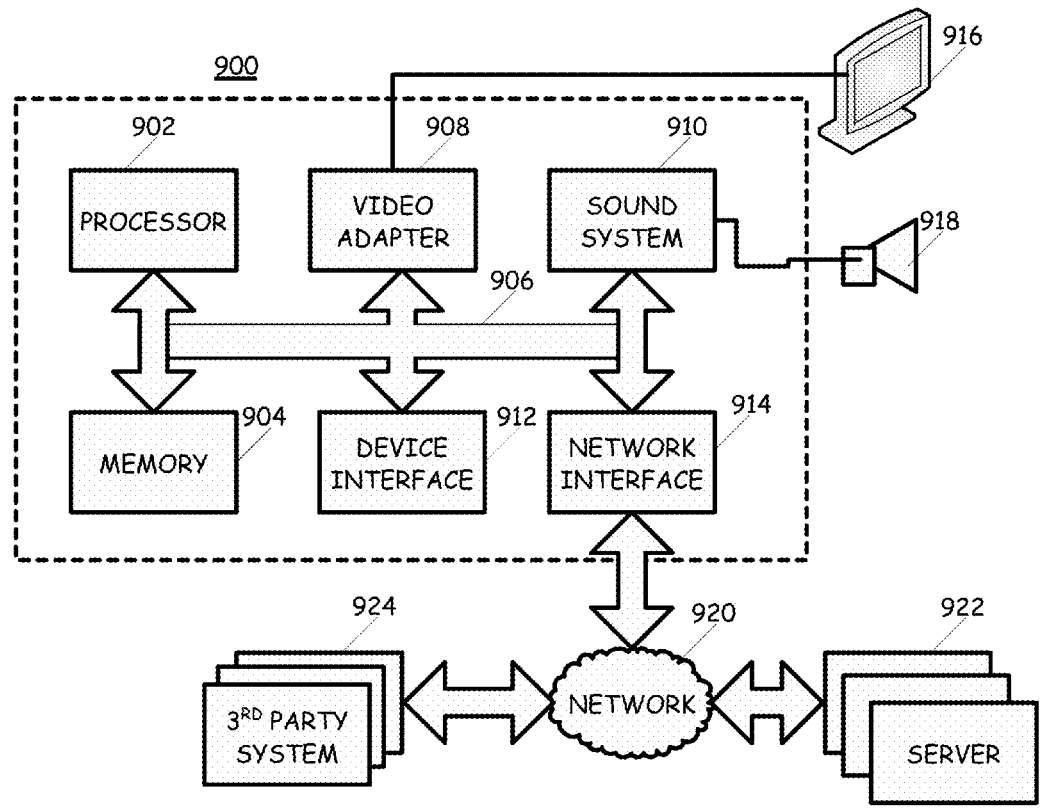
FIG. 9 is a functional block diagram of the components of an exemplary environment or platform in aspects or elements of the computer implemented system of FIG. 8 can be implemented or an application, module or routine utilizing the various embodiments can be implemented.

FIG. 9 is a functional block diagram of the components of an exemplary environment or platform in aspects or elements of the computer-implemented system of FIG. 8 can be implemented or an application, module or routine utilizing the various embodiments can be implemented. It will be appreciated that not all of the components illustrated in FIG. 9 are required in all embodiments or implementations but, each of the components are presented and described in conjunction with FIG. 9 to provide a complete and overall understanding of the components. In addition, it will be appreciated that the embodiments may be implemented in systems and/or environments that may include other components and functionality and as such, the illustrated configuration is simply a non-limiting example.

The exemplary platform 900 is illustrated as including a processor 902 and a memory element 904. In some embodiments the processor 902 and the memory element 904 may be communicatively coupled over a bus or similar interface 906. In other embodiments the processor and the memory element 904 may be fully or partially integrated with each other. The processor 902 can be a variety of processor types including microprocessors, micro-controllers, programmable arrays, custom IC's etc. and may also include single or multiple processors with or without accelerators or the like. The memory element of 904 may include a variety of structures, including but not limited to RAM, ROM, magnetic media, optical media, bubble memory, FLASH memory, EPROM, EEPROM, etc. In addition, rather than being internal to the platform 900, the memory element 904 may be external to the platform 900 and accessed through a device interface 912 or network interface 914. The processor 902, or other components may also provide sub-components or functionality such as a real-time clock, analog to digital convertor, digital to analog convertor, sensors, etc. The processor 902 also interfaces to a variety of elements including a control/device interface 912, a display adapter 908, audio adapter 910 and a network/device interface 914. The control/device interface 912 provides an interface to external devices, systems, equipment, sensor, actuators or the like. As non-limiting examples, the control/device interface 912 can be used to interface with devices or systems such as a keyboard, a mouse, a pin pad, and audio activate device, a PS3 or other game controller, as well as a variety of the many other available input and output devices or, another computer or processing device. The display adapter 908 can be used to drive a variety of visually oriented alert elements 916, such as display devices including an LED display, LCD display, one or more LEDs or other display devices. The audio adapter 910 interfaces to and drives a variety of audible or other alert elements 918, such as a speaker, a speaker system, buzzer, bell, vibrator, etc. The network/device interface 914 can also be used to interface the computing platform 900 to other devices or systems through a network 920. The network may be a local network, a wide area network, wireless network (WIFI, Bluetooth, cellular, 3G, etc.), a global network such as the Internet, or any of a variety of other configurations including hybrids, etc. The network/device interface 914 may be a wired interface or a wireless interface. The computing platform 900 is shown as interfacing to a server 922 and a third party system 924 through the network 220. A battery or power source 228 provides power for the computing platform 940. FIG. 8 is a schematic illustration of an exemplary embodiment of the system suitable for implementing various embodiments of texting system, including without limitation, the embodiment illustrated in FIG. 1. Here, a wireless device 200, which may be any suitable message initiator, transmits a text message, an SMS message, an instant message or an MMS message or the like (collectively referred to as message or text message) (block 201) which system, as indicated in block 202, selects a keyword input at block 202, and selects content related to said keyword. There may be a link of streaming content (block 203) associated with block 202. There may be a data base content source 204 associated with block 202. Wireless device memory 205 may be associated with block 202. Uploaded content, as indicated at block 206, may be associated with block 202. In each case, the content is then embedded, associated or otherwise linked to or made accessible from the message.

The system of FIG. 8 provides for the wirelessly received message with the content embedded or attached from block 202 be received at block 207. Block 207 may also be associated with blocks 203, 204, 205 and 207. It should be appreciated that throughout this description, the content to be included in a message can be located at one or at multiple of a variety of locations. For instance, the content can be stored on the actual wireless device, the cloud, local systems in communication with the wireless device, websites accessible through the world wide web, or the like.

The content within the received message from block 207 is accessed at block 208 and transmitted to the user, who can either purchase the full version of the content, indicated by block 209, or not purchase the full version as indicated at block 210. In some embodiments, a clip can be generated from a full or longer video and/or audio file. For instance, a sliding selector can be used to select a portion of a video/audio file that will automatically capture and cut the multimedia audio or video content and add it to a text message to share.

The user may decide to share the content at full version purchase indicated in block 209 (see block 211) or not share the purchased full version (see block 212). The user may also decide not to purchase the full version but share the clip, as indicated at block 211, or not share the clip (see block 212). The process of the system of FIG. 8 ends (see block 213).

The key word or key words (which may also include text sequences, icons, emoticons, graphics, URL's other content, audible commands, audio, video, etc.) that are input in the body of the text message through a first mobile user's interface may be utilized to access, index into, or form search queries into a database that can provide a select list of audio and/or video recordings, graphic images, URL's and other content based on the first mobile device user's text message content typed, selected or otherwise entered in by the first mobile device user (and second or group of users if the system is installed on their wireless device) and includes a list of content, such as audio and video recordings as non-limiting examples. The method and system herein attaches and embeds the selected content (e.g. audio and/or video recording) within the text message from the first mobile device user and sends it to a receiving (second) mobile device. The content (e.g. audio or video file) may be accessed and uploaded into the text message or instant message or the audio or video file may be attached as a link to the audio or video that is streamed from the first mobile server to the wireless device from the receiving device or group of devices.

In exemplary embodiments, the database may comprise a library of content, such as audio and video recordings as non-limiting examples) that are categorized by key words, symbols, emoticons or other techniques or triggers and that bears a relationship to the message to be sent, such as directly relating to the title of an audio or video recording or key words from within the body of work within the audio or video recording as non-limiting examples, each of which may be associated with titles, lyrics, categories or exact text associations to key words contained within an audio or video recording, such as "touch", "leave", "care", "kiss", "birthday", "valentine", "Christmas" and such. For example; a first mobile device user types a text message saying, "I want to kiss you". The user's mobile device accesses one or more content sources and/or databases to identify content, such as audio or video files, that may be stored in memory within the device such as iTunes (may access a plurality of data sources simultaneously) or other downloaded or cloud connected content libraries as known in the art and a list of audio recordings or video recordings appear in the mobile device display such as the following exemplary options:

"I Want To Kiss You" by Devin
"I Want to Kiss You" by Laurelyn Carter
"I Want to Kiss You" by Edward O'Connell
(I Want To) Kiss You All Over" by Dirt Merchants
"Kiss You All Over" by Exile
Applicable greeting card categories (i.e., Birthday, Christmas, Valentine, etc.)
Applicable subscriptions
Links to information regarding relevant web content (i.e, such as current related events)
Relevant promotional events links (i.e., relevant sales at merchants)

A first mobile device user selects a preferred recording title or content from the source(s) and it facilitates the selection and embeds or creates a link to be able to stream the recording into the specified message to be sent to the receiving device (second mobile device or group of devices) in cooperation with the audio and/or video recording.

In some of the embodiments, the displayed order of the audio or video recording or other content may be derived from random selection, a pre-designated order, on a pay-for-position order or some other designation format such as Google Ad Words as a non-limiting example.

In some of these embodiments, the message includes text, an audio recording and/or a video recording. And in other embodiments, the software is able to cause the computer to provide a user interface that can facilitate specific requirements of the message.

Various preferred embodiments may include media containing the database containing a plurality of audio and video recordings associated with selectable exact key word or key words categories.

Another general aspect in various embodiments is to utilize another system that interfaces to the one or more sources for receiving triggers, parameters or queries from the mobile device and then automatically searching the sources for matching or qualifying content. This system will be referred to as the search engine. Thus, in such embodiments the search engine can be utilized to identify and provide potential content to the mobile device and the mobile device can then transmit a selected content item to the desired destination in the message. In other embodiment, the search engine may operate to send a transmission of a text message that includes embedded audio or video content from a cloud-based computer-implemented system to a first mobile device, second mobile device or a group of mobile devices having a unique context identification number.

In any of the embodiments, utilization of the search engine to send a wireless transmission in response to a text message that is received and includes embedded or links that may include streaming audio or video content direct to a first, second or a group of wireless mobile device communication from a search engine accessible database containing automated answers to a plurality of questions asked by a text message or instant message user that is catalogued by specific categories or individuals such as Presidents, Dignitaries, Professional Athletes, Celebrities, Character's or other persons, whether animated, living or deceased all based on key words.

Figure 1:
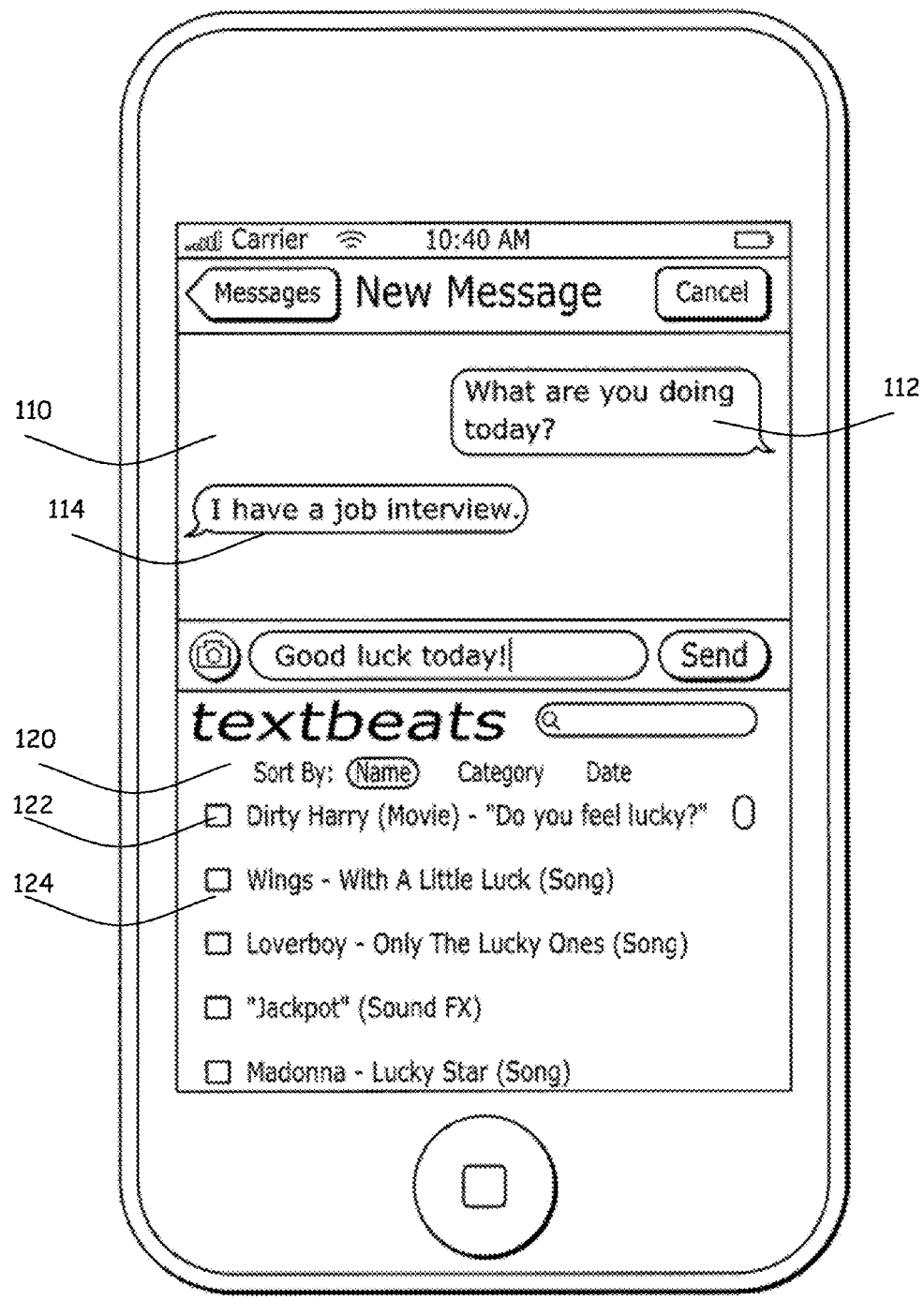
FIG. 1 is an illustration of a trading of messages where the answer by the recipient generates creation of a menu of audio and/or video content relating to the answer by the recipient.

Reference is made to FIGS. 1 to 7 as a non-limiting example of how to carry out the operations that may be implemented in various embodiments. FIG. 1 shows an exemplary user interface of a text messaging application embedded within and operating on the platform of a mobile phone. In the dialog box 110 of the texting application, an inquiry is shown as having been made by the first user of a phone ("What Are You Doing Today?") 112. This message was directed to a recipient, the user of the other phone (recipient), who replies with the answer: "I have a job interview," 114 (shows up on first phone—FIG. 1). In the illustrated example, the sender decides to answer "Good luck today!" Based on this input, the system searches the database and selects available (in the illustrated example 5) audios and/or videos or other content relating to the concept of "Lucky". The available content is presented in the TEXTBEATS window 120. The user of the first phone selects one of the listed items displayed in the TEXTBEATS menu window 120.

Figure 2:
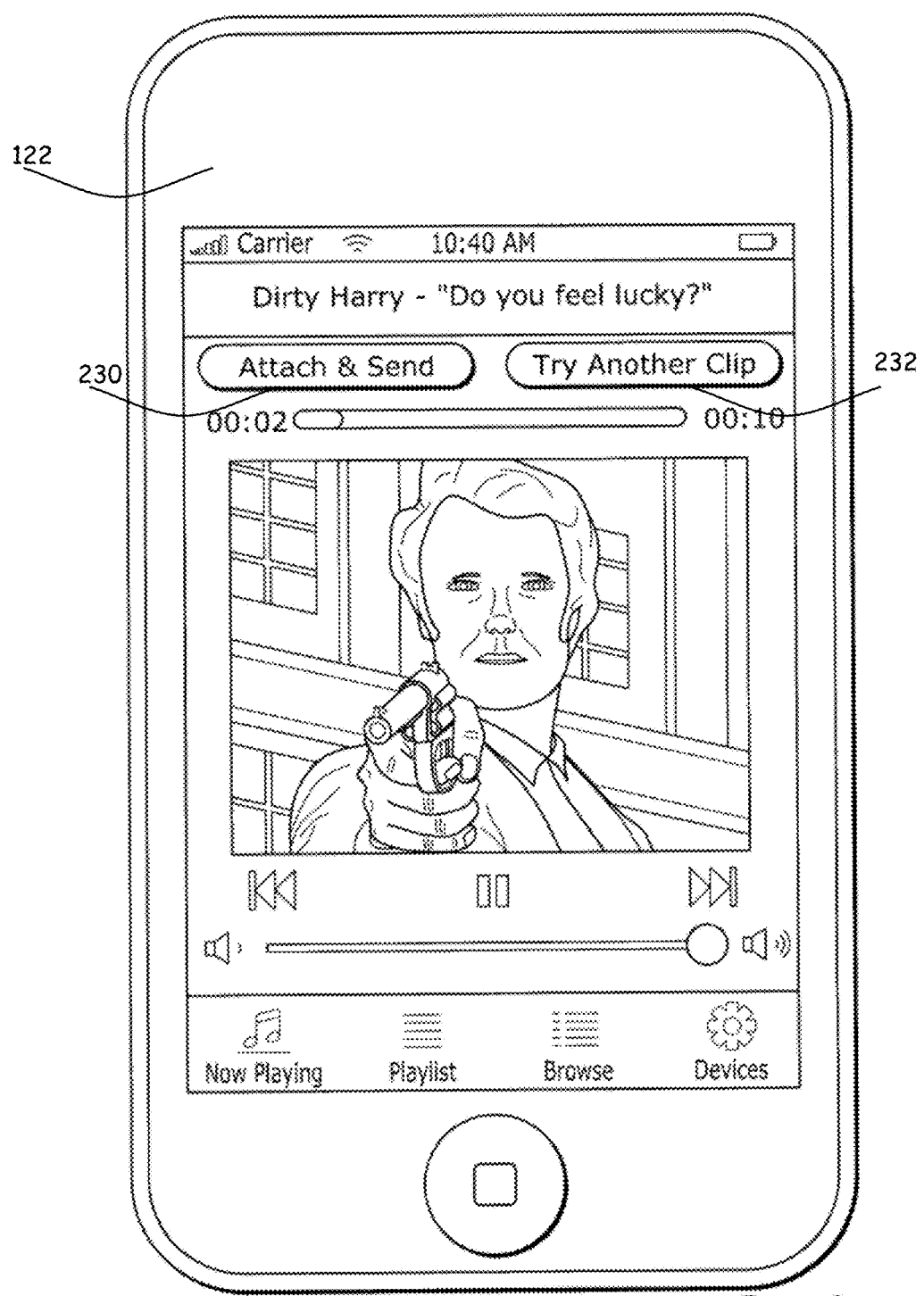
FIG. 2 is an illustration of one of the menu selections of FIG. 1 which can be attached and sent to the recipient.

In the illustrated example, the user has selected the first item displayed in the TEXTBEATS window 120, the clip of Dirty Harry saying "Do you feel lucky" 122. FIG. 2 illustrates an exemplary user interface screen presented after the user's selection. The selected audio/video 122 shows up on the sender's phone (FIG. 2) where the sender has various options as shown, including the presentment of a player device for previewing the content. One of the options is to attach and send the content selection 230, such as including the content in the text message that was being created. Another option is for the user to try another clip or content 232. If the user selects the latter option, the menu of FIG. 1 is re-displayed allowing the user to make an alternative selection. It will be appreciated that other content may also be included as enumerated herein, such as but not limited to, greeting cards, links, gift cards, subscriptions etc.

Figure 3:
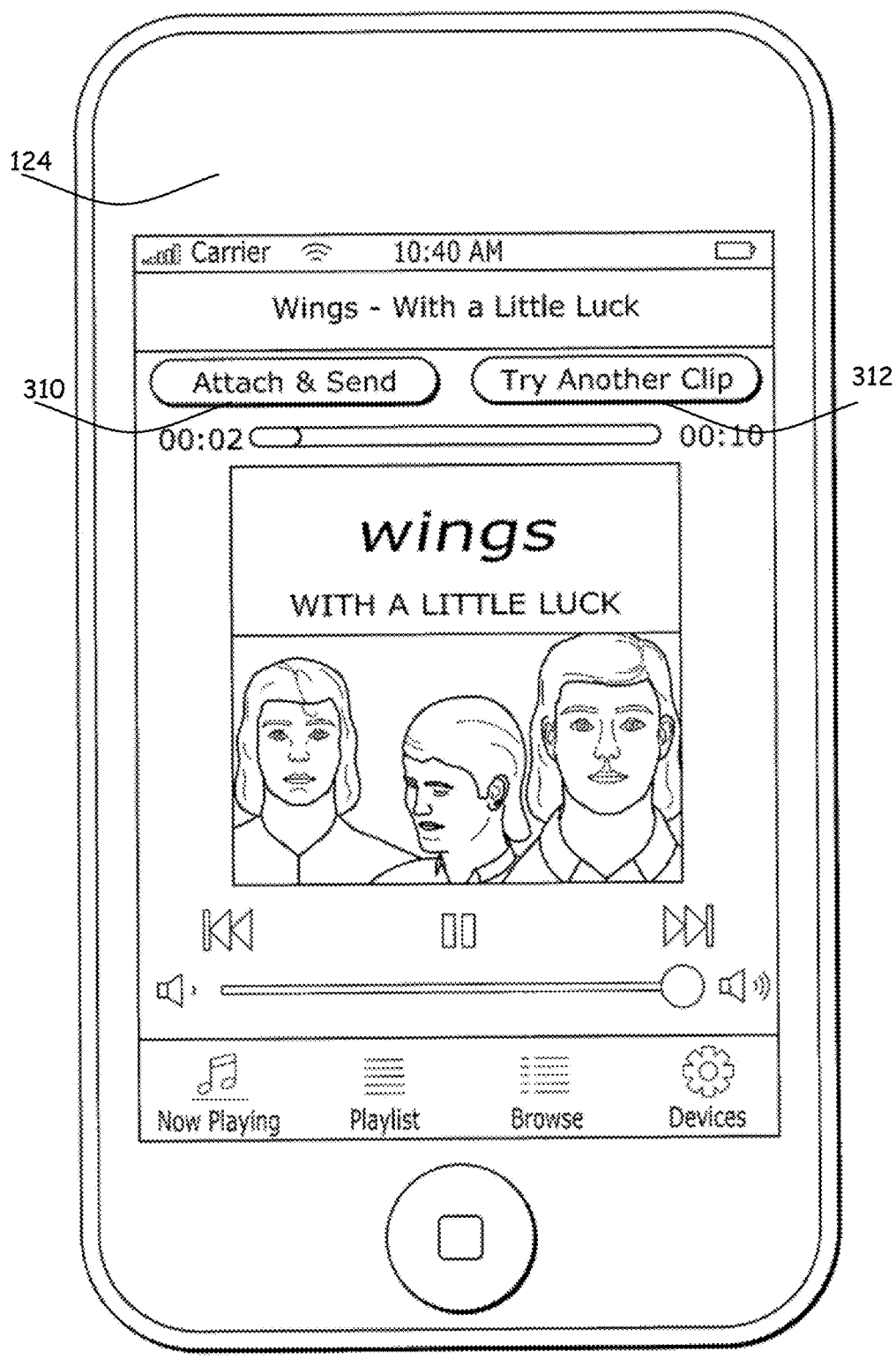
FIG. 3 is an illustration of an alternate menu selection which can be attached and sent to the recipient.

In the illustrated example, FIG. 3 shows the results of a user having selected content item 124 Wings "With a Little Luck" either initially or after the user actuates the Try Another Clip 232 option. In either case, the sender is shown as having selected the alternate audio/video clip and again, the user can select to attach and send 310 the clip or try another clip 312. After the content has been selected, the message with the embedded, linked to or otherwise associated content can be sent to the recipients cell phone.

Figure 4:
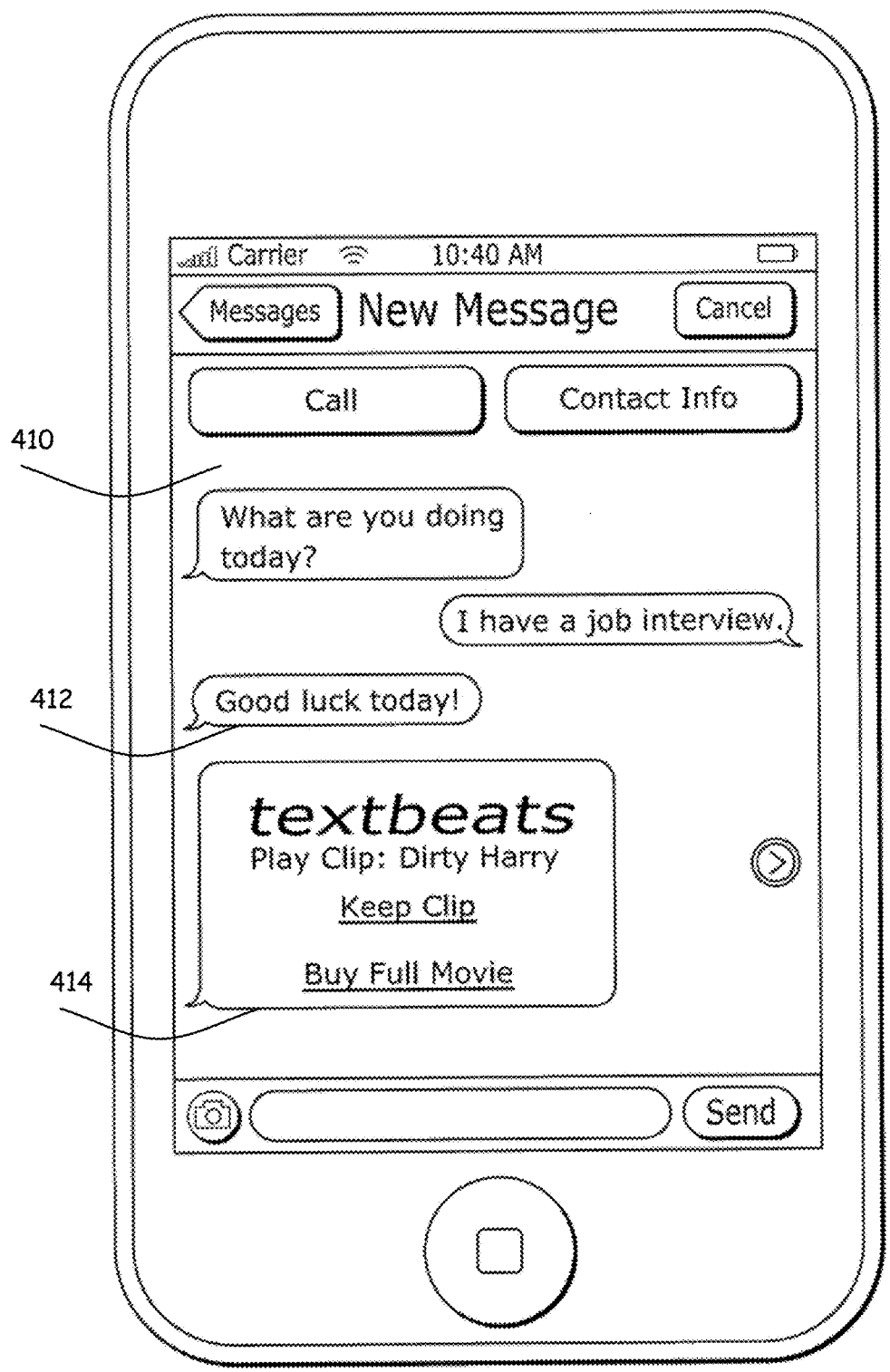
FIG. 4 is an illustration of the recipient's receipt of the menu selection of FIG. 2 enabling the recipient to play the audio and/or video clip.
Figure 5:
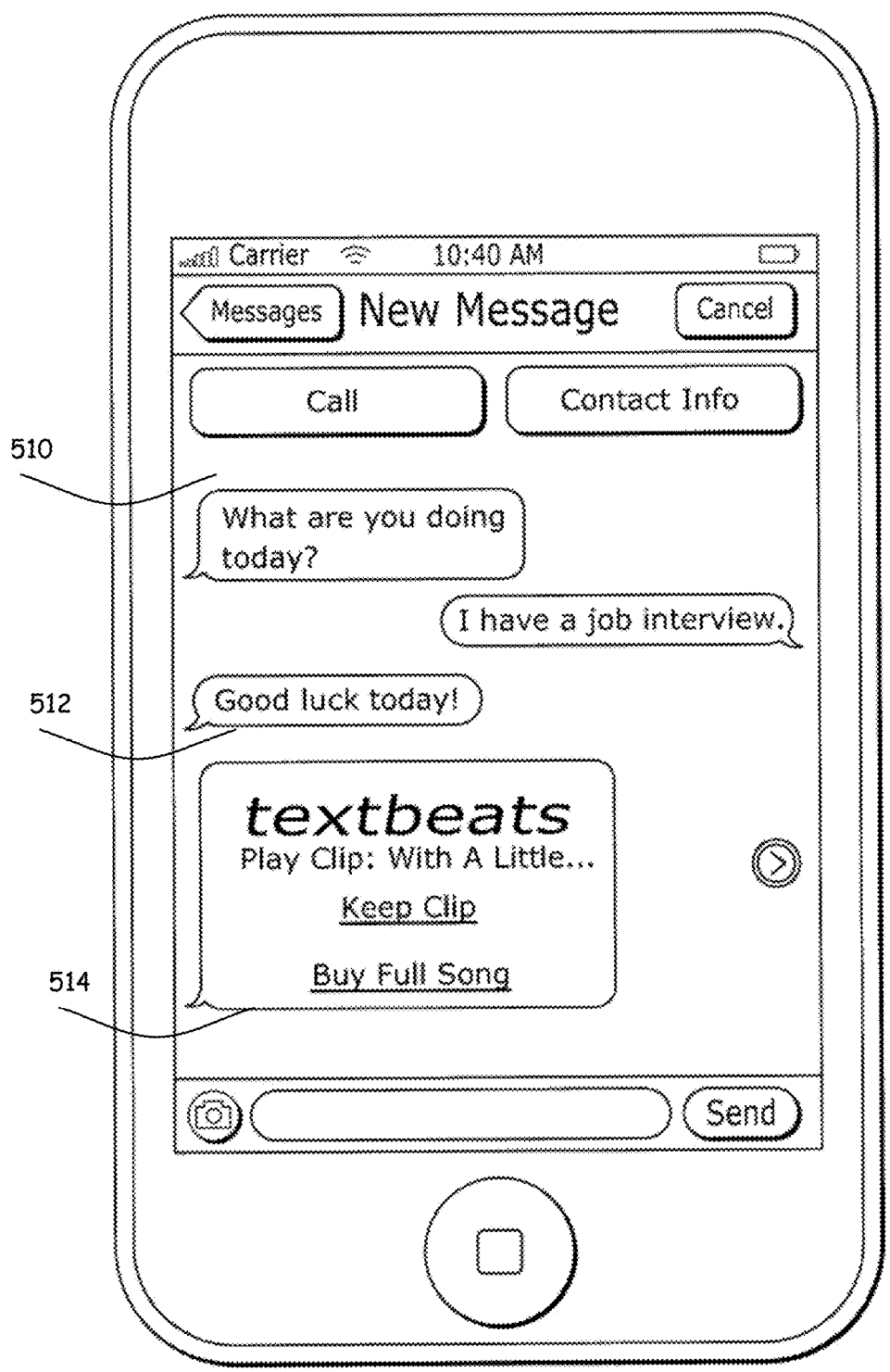
FIG. 5 is an illustration of the recipient's receipt of the menu selection of FIG. 3 enabling the recipient to play the audio and/or video clip.

FIG. 4 shows an exemplary user interface presented on the display of the recipient's cell phone after the message 122 has been selected, sent and delivered. In the illustrated example, the recipient's screen illustrates the text messaging window 410, which now includes message "Good Luck Today!" 412 and another text element, referred to as the TEXTBEATS element, which presents options to the recipient regarding the received content. For instance, the recipient can elect to play the selected audio/video clip or content, keep or save the content or buy a full version of the content if available (e.g., the album, a movie, the entire song, a book, etc.). FIG. 5 is similar to FIG. 4 and displays the alternate selection of Wings' "With a Little Luck" in the text screen 510 within the TEXTBEATS entry 514 below the message 512. Here, "With a Little Luck" is available for playback, saving or purchasing the full version or related items.

Figure 6:
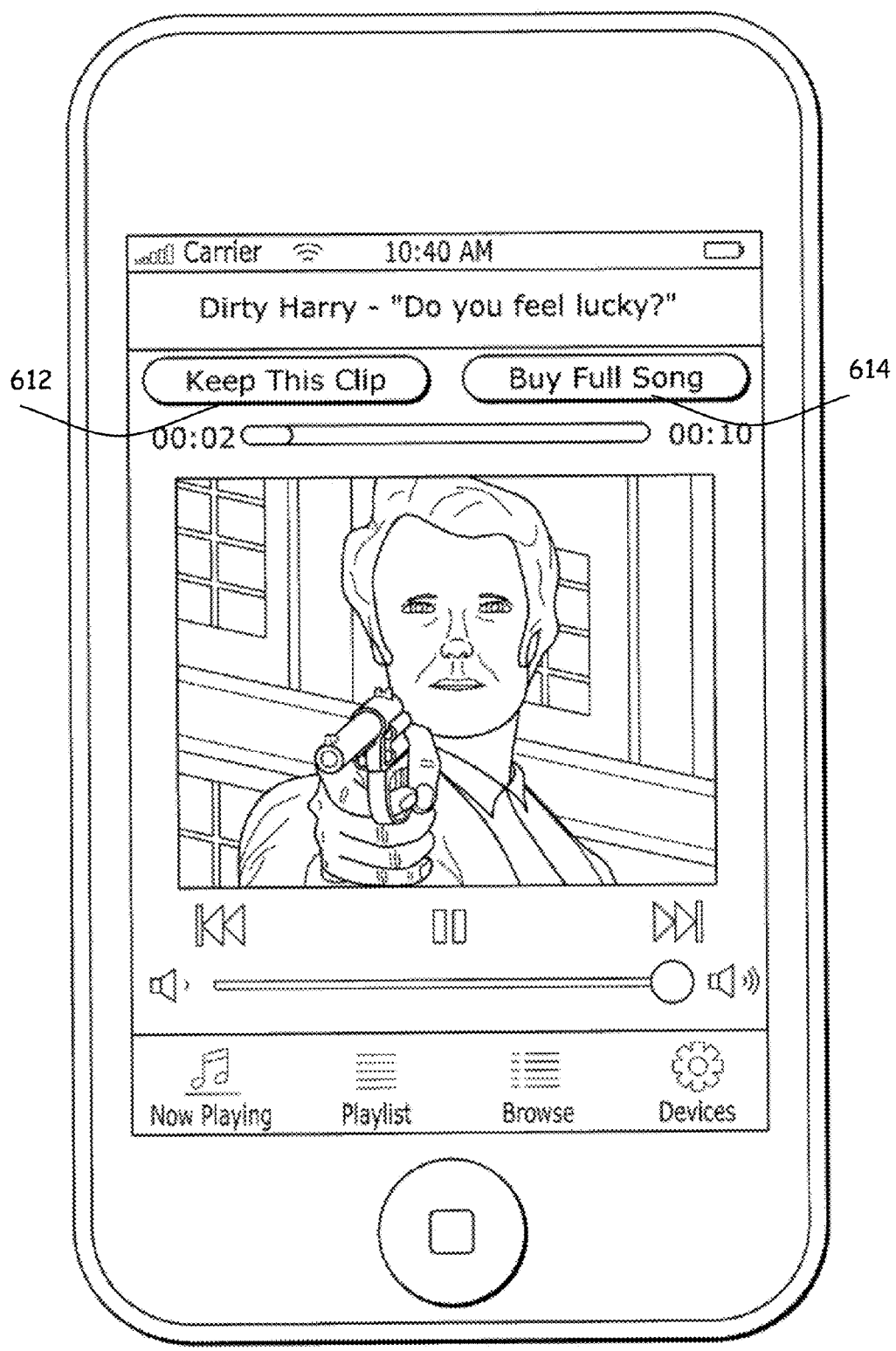
FIG. 6 is an illustration of the recipient's choices for either keeping the clip of FIG. 4 or purchasing the complete movie relating to the clip.
Figure 7:
FIG. 7 is an illustration similar to FIG. 6 where the recipient has the choice of keeping the alternate audio and/or video clip of FIG. 5 or purchasing the complete song relating to the audio and/or video clip.

FIG. 6 illustrates the play mode presentment on the recipient's cell phone of the selected and delivered clip 122 from FIG. 1 along with the presented options of keeping the clip 612 or buying the full song or content 614. Thus, the content shown in FIG. 4 can be stored or the recipient can buy the full movie from which it came. FIG. 7 illustrates the playmode presentment on the recipient's cell phone of the selected and delivered clip 124 from FIG. 1 along with the presented options of keeping the clip 712 or buying the full song or content 714. Thus, the content shown in FIG. 5 can be stored or the recipient can buy the full song from which it came. It should be appreciated that the content may include restriction, such as digital licensing rights, that would prevent the content from being forwarded to others. In addition, the content set up such that it can only be viewed or shown for a limited or a limited number of times (i.e., one time view only) then it will delete out of the message with no storage on device. This is similar to the SNAPCHAT technology and operates to protect and prevent the content from re-distribution. "Clip" as used herein can be an audio clip, a video clip, sound effect clip, or a combination of audio and video and, in some contexts may even include graphics, a playback of multiple graphics such as a slide show, etc.

Thus, there is disclosed a text messaging and instant messaging computer-implemented system and method for providing embedded multi-element content (text message and the inclusion of additional content such as recorded audio or video as non-limiting examples) by authenticating a wireless device compatible with multiple transport technologies (such as cellular networks, satellite networks, cloud based networks, internet networks, Bluetooth networks, near field communication networks or any other peer to peer network as used in the art) and operable to render a text message with an integrated audio or video embedded message or a link that connects to a streaming audio or video file within a text message originating from a first mobile device, second mobile user, a group of mobile users, Instant Messaging, SMS (Short Message Service) or MMS (Multimedia Message Service) in a manner consistent with the capabilities of the recipient device (second mobile device). The system and method includes: transmission of a text message that includes embedded audio and/or video content having a context identification number from a first mobile device to a second mobile device. This may include a mobile station (MS) receiving a wireless message. A judgment may be made whether the received message is a general SMS message or an SMS message for an MMS. The message may be directly stored if the received message is a general SMS message. The recipient may then be informed of a message reception.

The message initiator may also begin the message by utilizing the said method. The audio or video content may be accessed through the content that is stored on the wireless device or through a remote cloud or Internet connected database.

In various preferred embodiments, the first authenticating is provided at a mobile device compatible with multiple transport technologies (such as 4G and 5G networks) and operable to render an integrated audio or video embedded message within a text message originating from a first mobile device. Authentication can take place through a satellite and/or peer to peer. A second mobile device is enabled to respond to the first device message and an instant response will be provided based on the content of the message sent or received.

Figure 10:
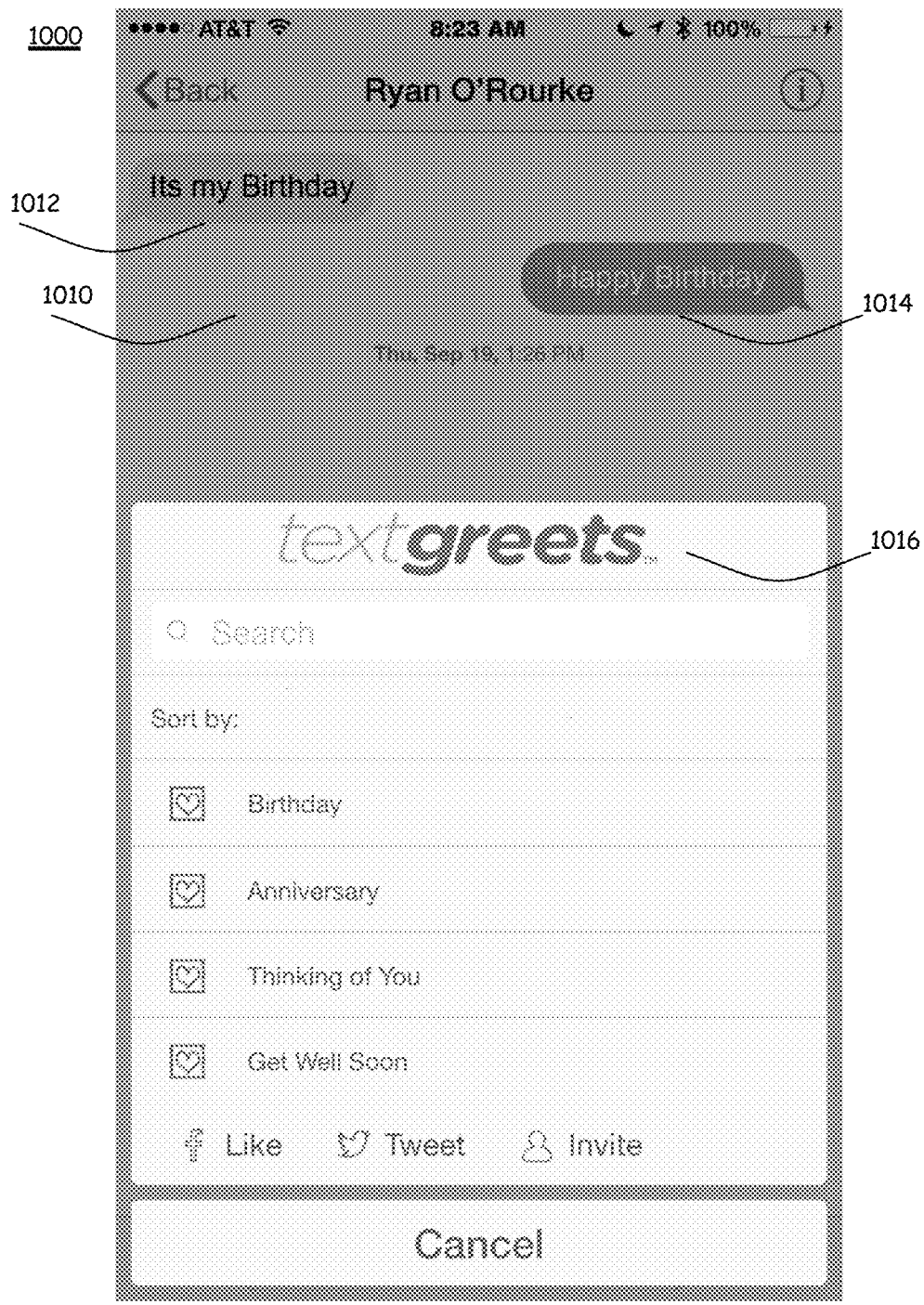
FIG. 10 is an exemplary user interface screen for a texting application that incorporates the greeting card feature.

Another aspect or feature that may be incorporated into various embodiments is the inclusion of gift cards as content to be searched for, selectable and embeddable within the text messages. FIG. 10 is an exemplary user interface screen for a texting application that incorporates the greeting card feature. In the illustrated embodiment, the screen 1000 includes a texting area 1010. In the illustrated texting area, the user has received a message from Ryan O'Rourke saying "Its my Birthday" 1012. In response, embodiments may search the received text and automatically pull up a list of content with which the user may respond and may even automatically generate the displayed response message "Happy Birthday" 1014. Further, it should be understood that in any of the embodiments, the key word searching, contextual searching, etc. can be performed on the messages to be transmitted, the messages received and a combination of both, as well as other information such as the user's calendar, time of day, day of week, current events, weather, holidays, location, etc. Thus, many factors may be taken into consideration when obtaining suggested or available content to be included in a message. In addition, a query engine maybe implemented to interface to one or more trigger sources and from the information obtained, heuristically generate queries for content. For instance, the query engine can pull up content based on contextual input (typing) so that upon typing in a character (such as an emoticon, or after any characters) it immediately will begin pulling up relevant content based on the characters. As a non-limiting example, if a user enters an emoticon with a smiley face with a birthday hat on it, it will pull up birthday greeting cards/clips etc. If the user types BIR, the system may operate to it will do the same thing. Similarly, the current events may also be inputs to the query engine. For example, if it is Valentines Day, and user types in Hap (for Happy), it will assume that Valentines is the default for that day however will bring up a list related to Happy (like Birthday) as well as Valentines Day wishes.

Thus, in some embodiments, upon receiving a message, such as "Its my Birthday" 1012, the application may generate the response "Happy Birthday" 1014 and then pull up a list of greeting cards that can be included in the message or, a list of categories that can be further searched for a greeting card. Such a list of categories is presented in window 1016 of the screen 1000. In some embodiments, greeting cards can be presented along with the other types of content.

Another aspect that may be incorporated into various embodiments includes the provision of gift cards. In general, this aspect refers to including a gift card within a text or SMS message that is being sent to another party. For instance, a sending party may send a birthday, anniversary, get well soon, etc., greeting to another party and desire to include a gift card along with the greeting. This feature or functionality, which may be incorporated in various embodiments, would allow the sending user to select a greeting card to be sent to the recipient.

Figure 11:
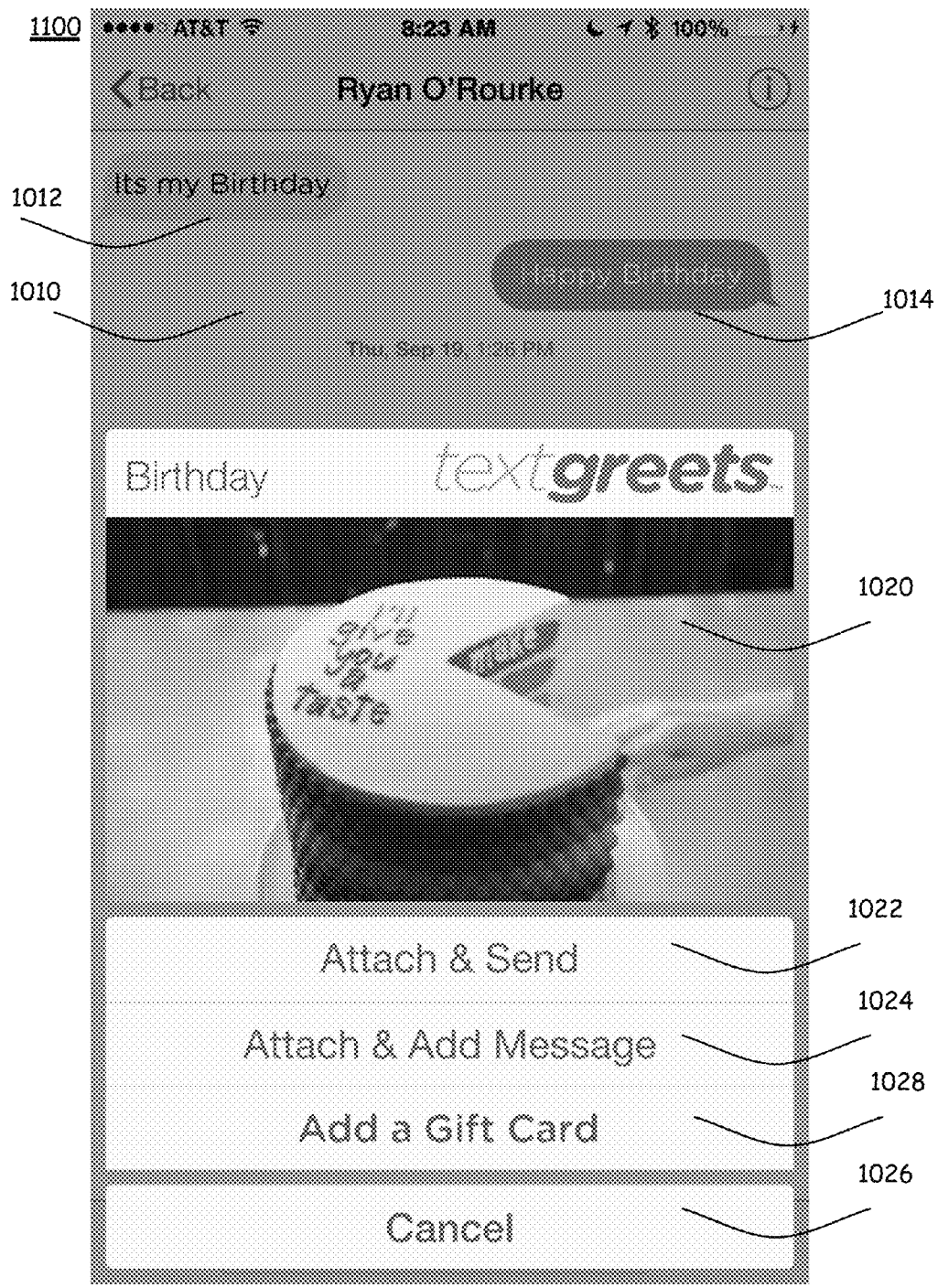
FIG. 11 is an exemplary user interface screen for the embodiment described in FIG. 10 after the user selects a greeting card.

FIG. 11 is an exemplary user interface screen for the embodiment described in FIG. 10 after the user selects a greeting card. As illustrated in screen 1100, the text area includes a message from the recipient saying "Its my Birthday" 1012 and a response from the sending "Happy Birthday" 1014. Further, the sender has selected to the illustrated greeting card 1020 and now in the illustrated embodiment, the sender has the option to attach and send the card 1022, attach the card and add a message 1024 or cancel 1026. Further, in some embodiments an additional feature including add a gift card 1028 may also be made available to the sender. The selected greeting card may be an image, an audio file, an image with an audio file, a video, a slide show, or any of the other variety of content mentioned herein as well as other content.

Figure 12:
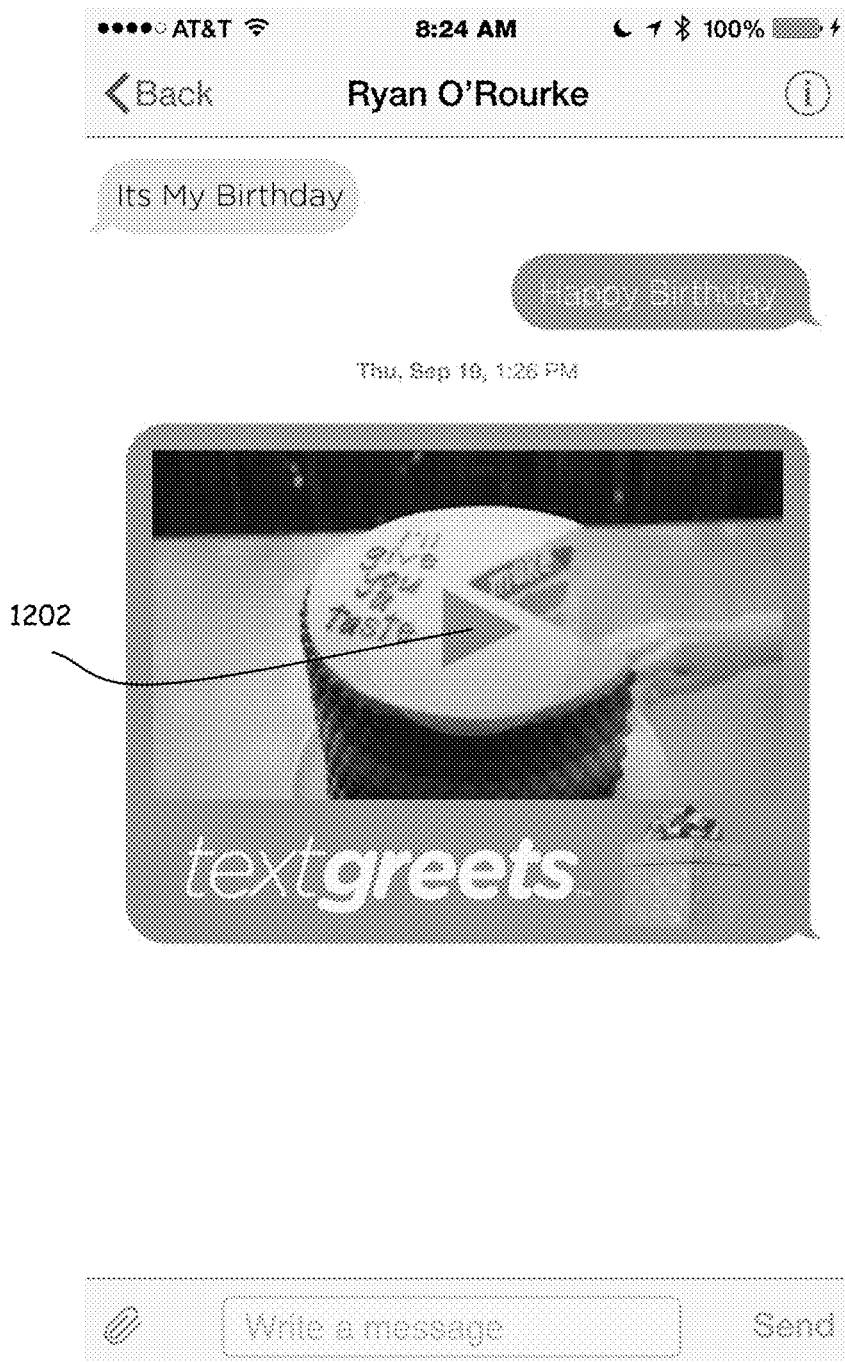
FIG. 12 is a illustration of the screen once the greeting card has been attached.

FIG. 12 is a illustration of the screen once the greeting card has been attached. The recipient can select the card, which in this case includes a play button 1202 that can be actuated to commence playback or rendering of the greeting card, such as a video, slide show or audio.

Returning to FIG. 11, the sender has the option to also add a gift card 1028. This feature includes the addition of a redeemable gift card that can be incorporated into and sent along with the message to the recipient. The recipient can utilize the gift card, once received. For instance, the gift card may be an electronic credit that goes to the recipient's PAYPAL account or other account utilized for making payments to physical stores and/or online stores. The electronic credit may also simply be stored on the smart phone and redeemed directly from the smart phone at a point of sale purchase or online purchase. Further, the gift card could operate as an E-Card, and operate similar to the Delta Airline Mobile Tickets. Even in some embodiments the gift card could be redeemed by printing it out and handing it to a merchant and the value associated with an identification number on the print out can be reduced as necessary. Those skilled in the art will appreciate that a variety of other techniques may also be used for the delivery and redemption of such gift cards.

Wireless E-Card is the way to describe, like a Delta Airline mobile ticket. Print out would be last line of activation.

Figure 13:
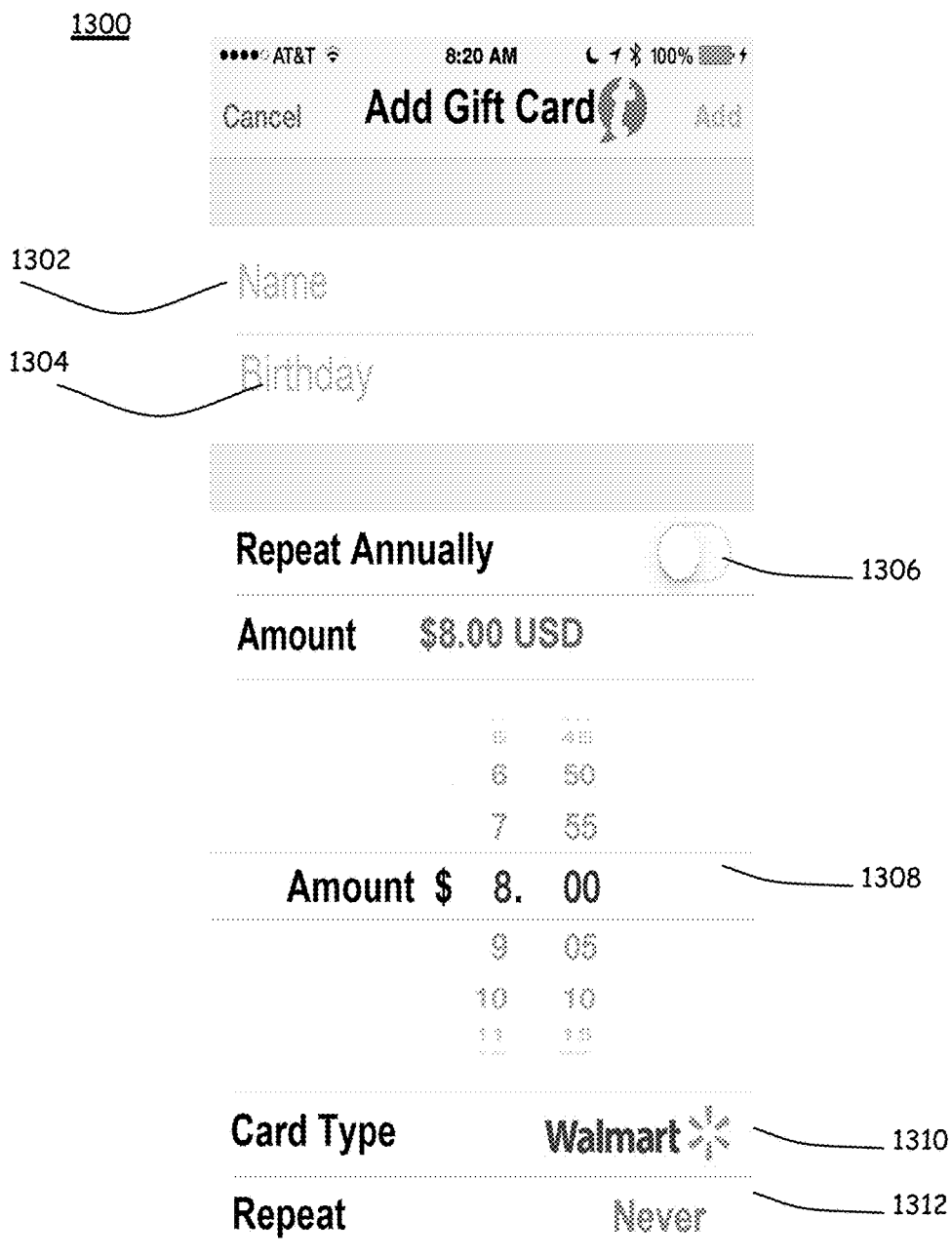
FIG. 13 is a user interface screen illustrating an exemplary interface for the creation of a gift card to be sent to a recipient.

FIG. 13 is a user interface screen illustrating an exemplary interface for the creation of a gift card to be sent to a recipient. For instance, the illustrated screen 1300 may be presented in response to a user actuating the add gift card 1028 option of FIG. 11. Although embodiments may vary, in the illustrated embodiment, the gift card screen 1300 includes a text window to place the name of the recipient 1302 and a text window to type in the occasion or memo regarding the gift card 1304. For instance, it could say happy birthday, congratulations, just thinking of you, etc. The user also is presented with a switch 1306 for enabling the gift card to be an annual event. In the illustrated embodiment, sliding the switch to the right will enable the gift card to be an annual event. Thus, the gift card could automatically be sent again next year or, the application may prompt the user to either send or modify the gift card for being sent on or near the anniversary date. The illustrated embodiment also includes a spinning wheel window 1308 for selecting the amount of the gift card. In the illustrated embodiment, the current value is set at US$8.00. The value to be credited with the gift card can be obtained from the sending party in a variety of manners. The sender may be prompted to enter credit card information or, if previously entered, the sender may be prompted to authorize the charge against the credit card. Further, the value may be credited or prepaid through the "in OS tray" provider or in a stand-alone app. Other techniques may also be utilized such as PAYPAL, or other third party deposit accounts in which the user has previously deposited funds. In addition, payment could be made through apps such as the APPLE STORE, GOOGLE STORE, AMAZON, etc. The "tray" or "deck" may also be used in the generation of a message, such as allowing the user to select content directly with the keyboard (i.e., add a video, add a picture, add an emoticon, etc.).

The user interface may also include a card type field 1310 in which the user can select the applicable merchant and/or merchants the card may apply. In the illustrated example, the merchant WALMART is shown as being selected. However, it will be appreciated that other merchants as well as general gift cards may be used (such as a Visa gift-card, etc.). In addition, when the user selects the add gift card function, in some embodiments, the textual content can be parsed and searched to identify triggers to use as search criteria for particular gift cards. For instance, if the text content indicates it is the recipient's birthday and the age of the recipient is determined from a source such as the text, the contact information, FACEBOOK, Google Plus, or other social media profiles, etc., then gift card suggestions for age appropriate, gender appropriate, etc. stores may be presented in a menu from which the sender can select or optionally search for other stores or merchants. In addition to the Repeat Annually switch, the user interface may also give the ability for the user to repeat the gift at other intervals, such as every month, every week, etc. by selecting or entering a value in text window 1312. In some embodiments, the repeat text window 1312 may be used to select the interval and the slide switch 1306 may simply be used to enable or disable the repeating of the gift. Otherwise, the switch may default to once a year and the repeat field used to modify the frequency to a different interval of time.

Figure 14:
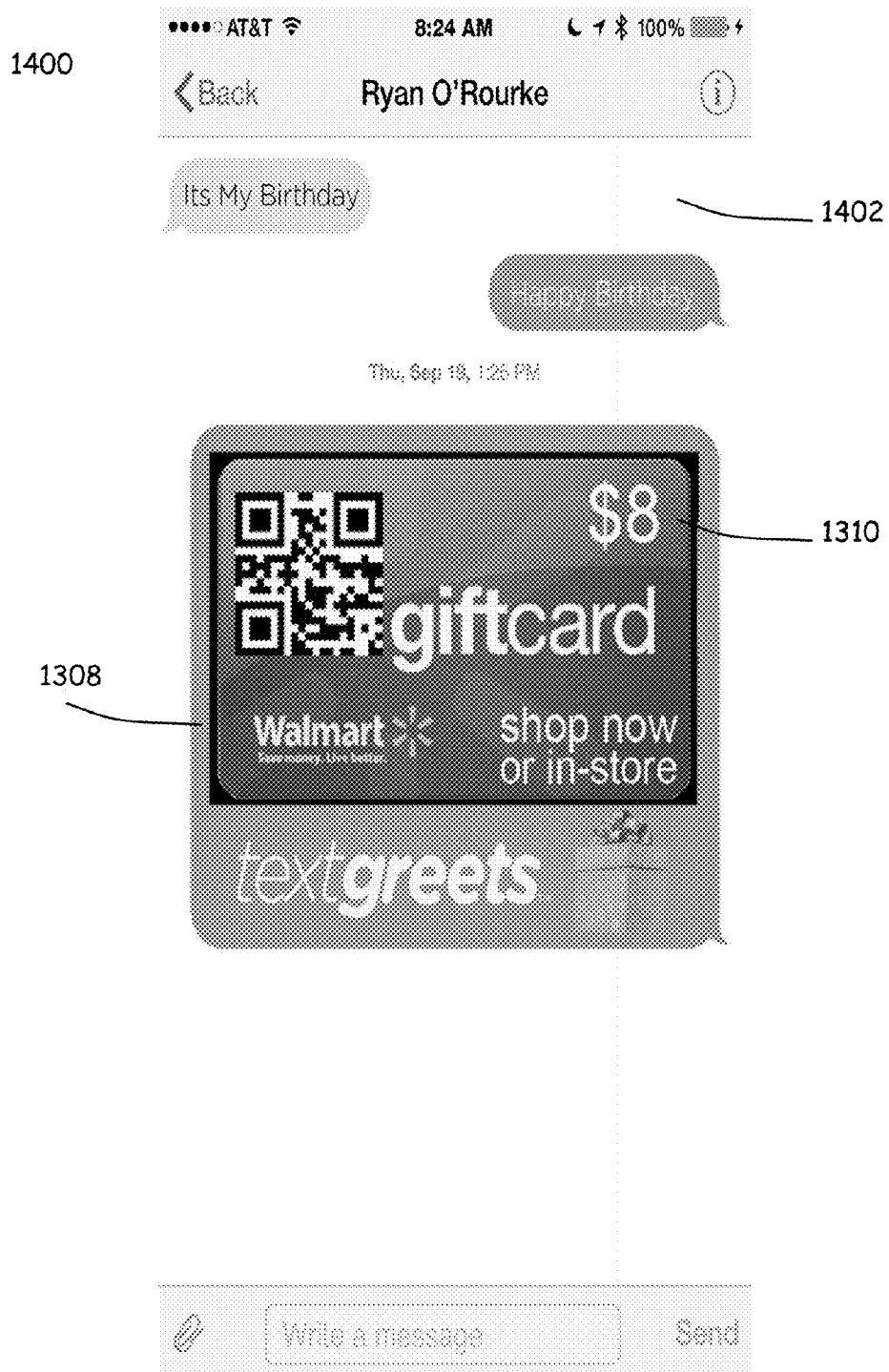
FIG. 14 is an exemplary user interface screen that could be displayed to a recipient after having played the greeting card or, having simply received the gift card.

FIG. 14 is an exemplary user interface screen that could be displayed to a recipient after having played the greeting card or, having simply received the gift card. In the illustrated embodiment, the screen 1400 includes a text window 1402 for sending and displaying received and sent text messages. In addition, the electronic gift card 1404 is presented to the recipient of the message. In the illustrated example, the recipient is shown as having received an $8.00 gift card. The gift card indicates that it can used for shopping online or for an in store purchase. The gift card can be invoked in a variety of manners depending upon the embodiment. For video content, in some embodiments the video content could be displayed over the entire screen or just a portion of the screen. Further, in some embodiments the playback of the video content is restricted within the "bubble" of the text message. As such, a thumb nail of the video, or some other icon is presented in the bubble to the text message and touching the thumb nail results in the play back of the video being rendered in that current location (i.e., within the area habited by the thumb nail.

In some embodiments, after the greeting card is presented (i.e., the video is completed for a video greeting card as a non-limiting example) the gift card is displayed and it can be invoked by touching the screen where the gift card is displayed. This is referred to under the trademark TOUCH TO CUE. Thus, in this embodiment, touching the gift card may cause a browser session to open for the merchant or merchants associated with the gift card or open an app that enables the user to shop from the represented merchant(s). The TOUCH TO CUE technology may also be set up such that once touched, funds are automatically transferred into the recipient's account, such as a PAYPAL account, an AMAZON PRIME account, banking account etc. In some embodiments the recipient may be prompted to select a destination and to provide information identifying the destination (i.e., account number or name, bank routing information, etc.). In addition or in lieu of the TOUCH TO CUE feature, a QR code as illustrated can displayed on the electronic gift card or some other code can also be used. Where compatible, this QR code can be scanned to identify the current balance associated with the gift card and apply it accordingly. Thus, at a point of sale terminal, the QR code can be scanned to invoke use of the gift card. Upon use of the gift card, the value associated with the gift card can be decreased and the displayed current value 1310 may also be augmented.

Figure 15:
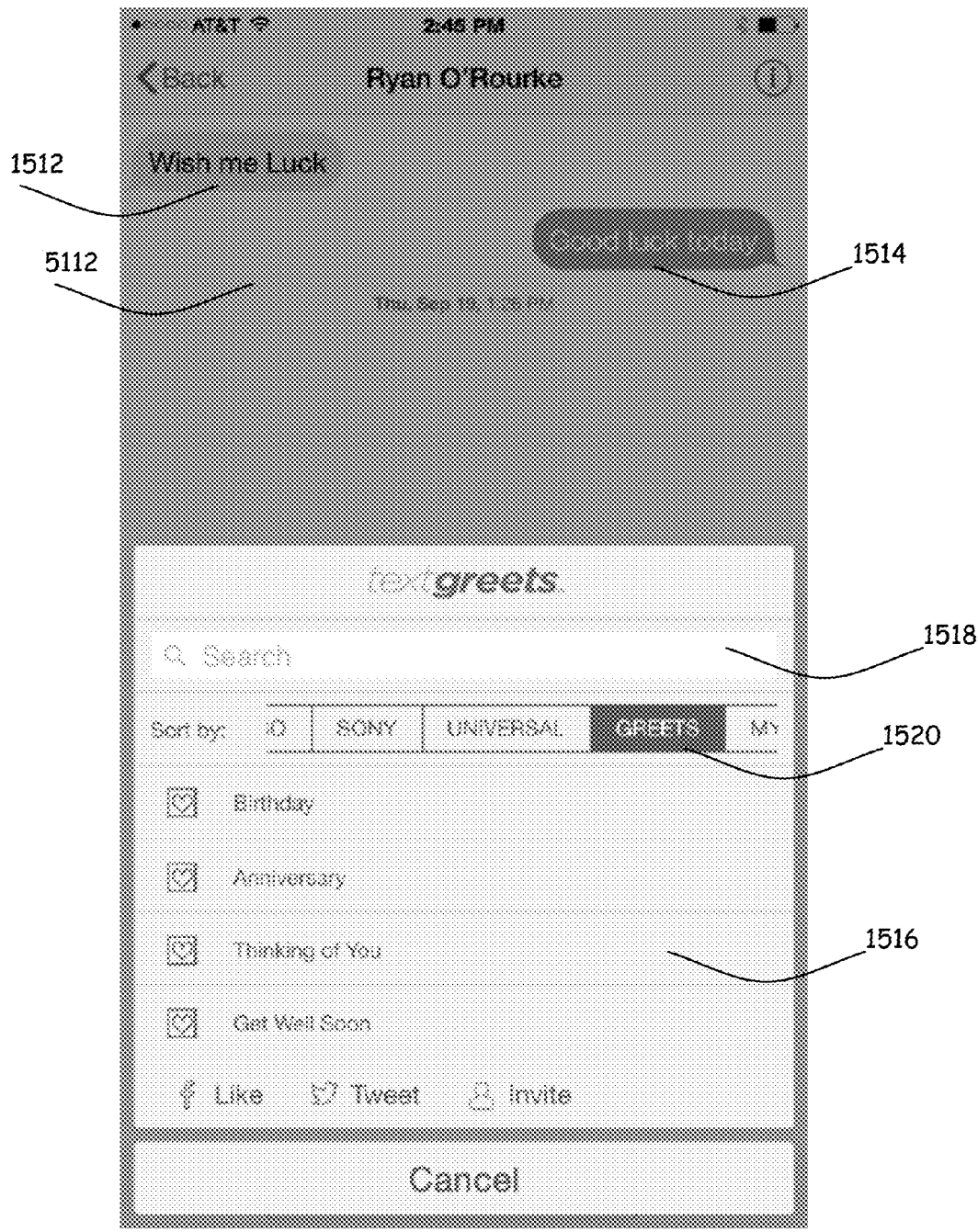
FIG. 15 is an exemplary user interface screen for a texting application that incorporates the greeting card feature with a sorting slide selector.

FIG. 15 is an exemplary user interface screen for a texting application that incorporates the greeting card feature with a sorting slide selector. In the illustrated embodiment, the screen 1500 includes a texting area 1510. In the illustrated texting area, the user has received a message from Ryan O'Rourke saying "Wish me Luck" 1512. In response, embodiments may search the received text and automatically pull up a list of content with which the user may respond and may even automatically generate the displayed response message "Good luck today" 1514. Further, it should be understood that in any of the embodiments, the key word searching, contextual searching, etc. can be performed on the messages to be transmitted, the messages received and a combination of both, as well as other information such as the user's calendar, time of day, day of week, current events, weather, holidays, location, etc. Thus, many factors may be taken into consideration when obtaining suggested or available content to be included in a message.

Thus, in some embodiments, upon receiving a message, such as "Wish me Luck" 1512, the application may generate the response "Good luck today" 1514 and then pull up a list of greeting cards (or gift cards when appropriate) that can be included in the message or, a list of categories that can be further searched for a greeting card. Such a list of categories is presented in window 1516 of the screen 1500. In some embodiments, greeting cards can be presented along with the other types of content. Further, the interface may include a search window 1518 to allow the user to enter other or alternate search criteria for obtaining recommended greeting cards or gift cards. For instance, the text presented in the search box 1518 can be used along with content in the text window 1512 or in lieu of such content. For example, the system or preference setting could be set to handle either case. Even further, a sorting slider 1520 may be used to filter and/or sort the available greeting card, gift cards or the like.

Figure 16:
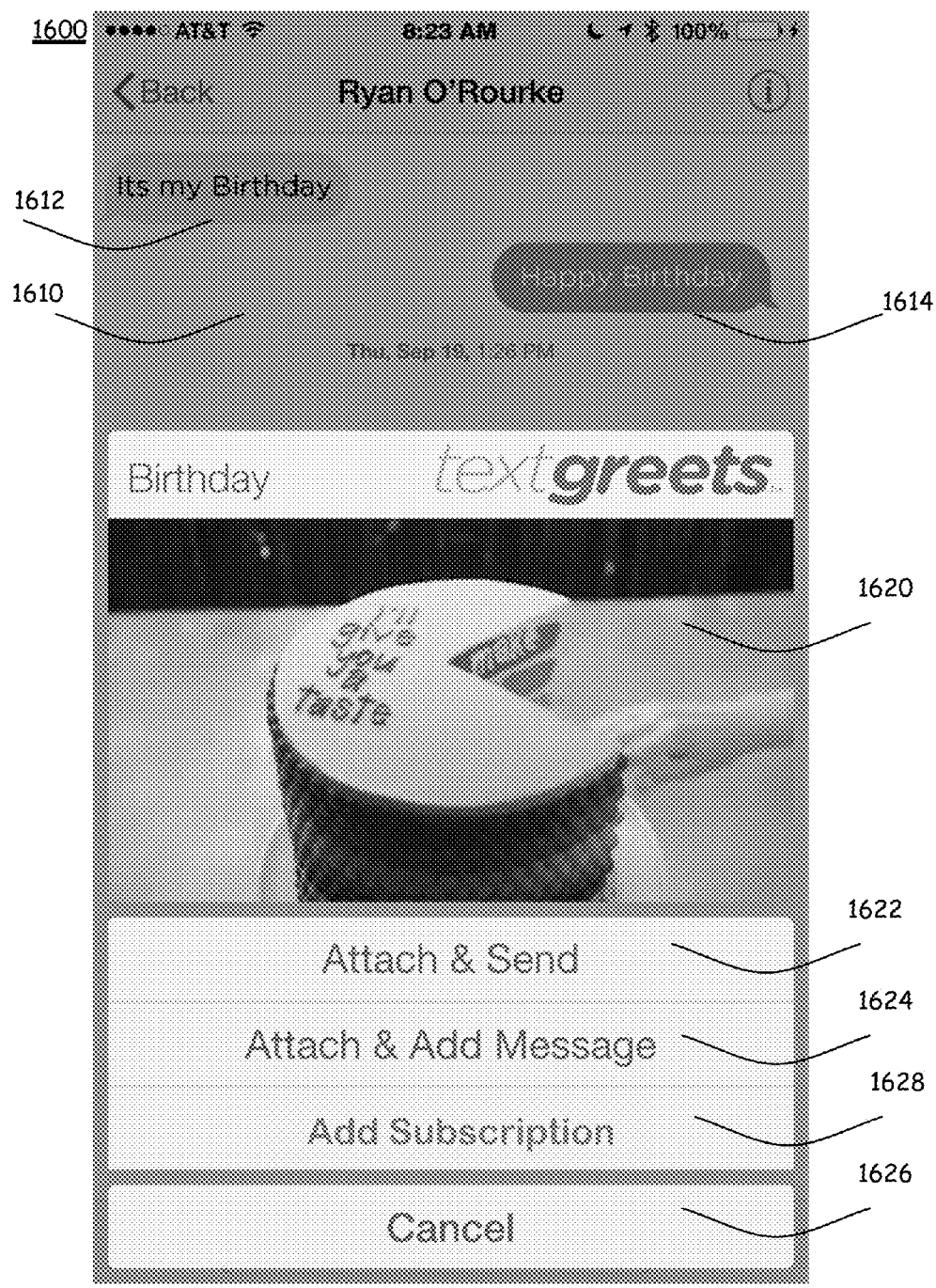
FIG. 16 is an exemplary user interface screen for an embodiment that includes the ability to send a subscription.
Figure 17:
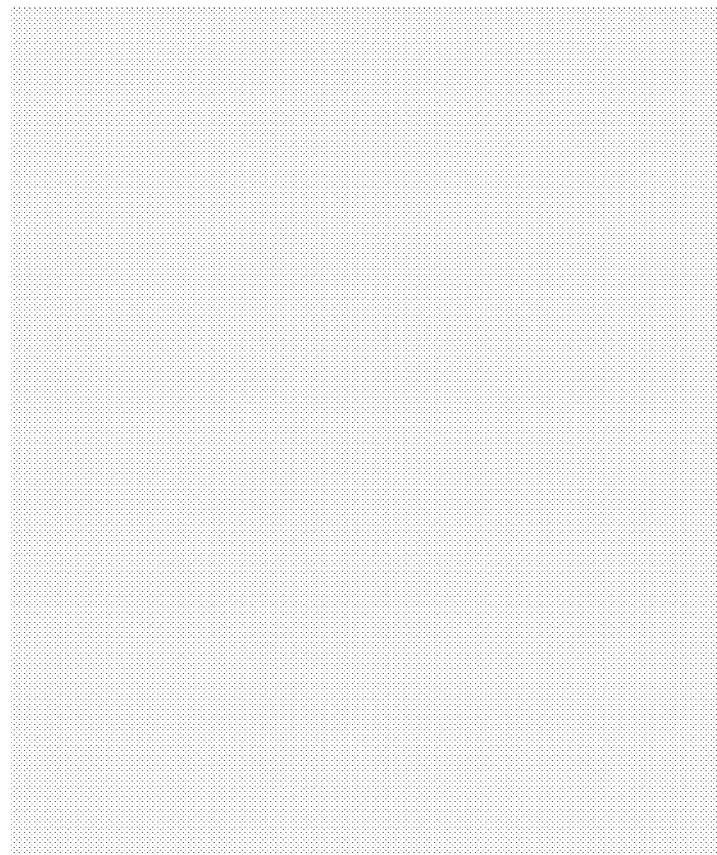
FIG. 17 is an exemplary screen that may be presented on the mobile device after the user selects the option to add a subscription (element 1628 of FIG. 16).

FIG. 16 is an exemplary user interface screen for an embodiment that includes the ability to send a subscription. As illustrated in screen 1600, the text area includes a message from a first party to a second party saying "Its my Birthday" 1612 and a response from the second party saying "Happy Birthday" 1614. Further, the second party has selected to include the illustrated greeting card 1620 and now, in the illustrated embodiment, the second party has the option to attach and send the card 1622, attach the card and add a message 1624 or cancel 1626. It should also be understood that the second party could be presented an option to attach or include the greeting card 1620 in a to be prepared, already prepared, or being prepared text message. Thus, the greeting card could be anywhere in the body of a text message similar to an emoticon.

Further, in some embodiments an additional feature including the ability to add and transmit a subscription 1628 may also be made available to the second party. In such embodiments, the party sending the message has the option to also add a subscription 1628. This feature may include a subscription to a service, such as an online service (iTunes, Hulu, NETFLIX, HBO GO, KINDLE, etc.), a product, such as a magazine, a cosmetic, beauty item, or any other of a wide variety of products, or a combined product and service. The subscription can be sent along with the message to the recipient. The recipient can utilize the subscription, once received. For instance, the subscription may be an electronic credit that goes to the recipient's PAYPAL account or other account utilized for making payments to physical stores and/or online stores. In addition, a gift card or subscription may also be pre-loaded and activated to use immediately— Apple Pay and other techniques could also be utilized. The subscription may simply be a notice to the recipient that he has been subscribed to the product and/or service and the details of the delivery of the same. In other embodiments, the subscription may be a shopping invite that enables the recipient to shop for and select his or her own choice for the subscription. The subscription may provide a list of available options or simply provide a ceiling on the periodic fee for the subscription and the recipient can shop for a select a subscription within that price range and/or have the option to pay additional fees to obtain a more expensive subscription (as such the subscription notice acts as a subsidy to the recipient's actual subscription). The subscription may be defined in terms of duration (i.e., one year subscription), total cost (i.e, provided until a certain amount of funds have been depleted), a particular number of deliverables (i.e, ten provisions of product and/or service), etc.

The subscription can be invoked or received by the TOUCH TO CUE technology described in relation to the gift cards. The electronic credit may also simply be stored on the smart phone and redeemed directly from the smart phone at a point of sale purchase or online purchase. The gift card may also be redeemed as a mobile ticket similar to the Delta Airline App with the ticket residing on the user's phone. Further, in some embodiments the gift card could be redeemed by printing it out and handing it to a merchant and the value associated with an identification number on the print out can be reduced as necessary. Those skilled in the art will appreciate that a variety of other techniques may also be used for the delivery and redemption of such gift cards.

In the illustrated screen 1700, the user is presented with the options of sending subscriptions to NETFLIX, HBONOW and APPLEBEATS. As with other content, the available subscriptions can be searched for and presented to the sender based on the content of the text messages and/or other search criteria or triggering information. In the illustrated embodiment the user has selected a subscription to NETFLIX 1710.

Figure 18:
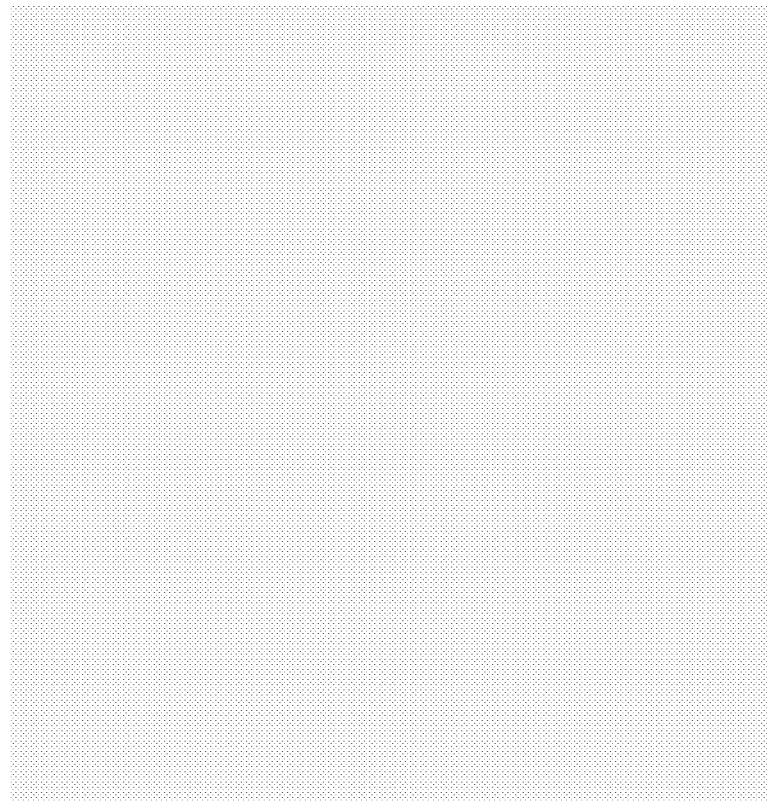
FIG. 18 is an exemplary screen shot showing potential options that the sender can select when adding a subscription.

FIG. 18 is an exemplary screen shot showing potential options that the sender can select when adding a subscription. The illustrated screen 1800 shows a few non-limiting actions or configurations such as a field to enter the name of the subscription 1810, a switch 1812 to actuate if the subscription is to be renewed or repeated annually or for some other interval of time 1812. A field to enter a period of time 1814 and a field to show the subscription type, which in the example is NETFLIX 1816.

Thus, some embodiments may include the gift card feature, some embodiments may include the subscription feature and some embodiment may include both and or other features. Thus, not all features are required for each embodiment and some features may be utilized in multiple embodiments.

It should also be appreciated that the value of the gift card may also be increased. For instance, the sender may send additional values to be associated with the card. Further, if the sender sends a gift card, the associated merchant may also add value to a gift card that is owned by the sender as an incentive or award for sending the gift card.

Having now described various embodiments, as well as aspects and features thereof, the implementation technology is now presented. Referring again to FIG. 8 and FIG. 9, the various embodiments may be implemented in a variety of manners. As a non-limiting example, various embodiments may be implemented as a down loadable application that can be identified at a application store, such as the APPLE app store or the GOOGLE app store as well as third party suppliers, and then downloaded and installed on a computer platform, such as a smart phone. The application can then serve as the user's texting interface thereby replacing or operating in lieu of other applications such as MESSENGER, HANGOUTS, etc. As such, the user can access an app store, identify the TEXTBEATS application, download the application, install the application and then invoke the application to begin texting. Once invoked, the user's phone may include an interface as presented in FIG. 1-FIG. 7 as a non-limiting example.

In other embodiments, the application may come pre-installed or as an integral part of the operating system or system software of a smart phone or other computer platform. In such an embodiment, the application is resident within the platform and can be invoked for sending text messages as per any of the various embodiments.

In yet other embodiments, the application may be implemented as a plug-in that is compatible with existing texting applications. Thus, the user may down load the plug-in (or the plug-in may be pre-installed on the platform) and the operation of various texting or SMS applications may be augmented by the plug-in such that they can present one or more embodiments of the present application.

Although the terms text messages and instant messages have been used, the system and method disclosed herein can be used to decode and/or encode and transmit any suitable communication by any suitable means.

Although a particular embodiment of the invention is disclosed, variations thereof may occur to an artisan and the scope of the invention should only be limited by the scope of the appended claims.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A system for incorporating a gift card into a text-based message to be sent between mobile communication devices, the system comprising:
 a memory element within a first mobile communication device configured to maintain the storage of instructions; and
 a processor embedded within the first mobile communication device and coupled to the memory element, the processor facilitates execution of the instructions to perform operations comprising:
  within an interface within a text messaging application being executed on the first mobile device, presenting a greeting card screen on a display of the first mobile device, the greeting card screen presenting options for the selection of a greeting card to be sent within a text message to a second communication device;
  receiving a selection of the greeting card;
  presenting an option to add a gift card to the text message;
  receiving a selection to add a gift card to the text message and in response to receiving the selection:
  presenting one or more indicia of merchants to be associated with the gift card;
  presenting a user interface to select a monetary value to be associated with the gift card; and
   receiving a selection of a merchant and a monetary value; and
   embedding a graphical representation of an electronic gift card for the selected merchant at the selected monetary value into the text message along with a machine readable code such that the gift card is received at the second communications device and directly displayed in a texting application being executed on the second communication device such that the machine readable code can be read at a point of sale terminal for utilizing the gift card in a purchase.

2. The system of claim 1, wherein the action of presenting one or more indicia of merchants to be associated with the gift card further comprises presenting the one or more indicia on a screen of the text messaging application such that a user can select an indicia to automatically cause the gift card to be associated with a merchant identified in the indicia.

3. The system of claim 1, wherein upon receiving a selection to add a gift card further comprising parsing the textual content of the text message to identify triggers to use as search criteria for presenting indicia for particular gift cards.

4. The system of claim 1, further comprising the action of presenting an interface to enable a user to select an interval for resending of the gift card at the selected interval of time.

5. A method for augmenting a text-based message entered on a user mobile communication device and to be sent to a recipient mobile communication device, the method comprising the actions of:
 during the action of composing a text message using an application on the user mobile communication device:
  presenting one or more selectable indicia on a user interface of the text message application on the user device such that at least one of the selectable indicia can be selected and, each selectable indicia corresponds with a merchant;
  receiving a selection of at least one of the selectable indicia;
  presenting an interface within the text message application to select a value to be associated with the selected indicia;
  receiving a selected value;
  generating an electronic gift card for the merchant associated with the selected indicia and having the selected value and sending a graphic image representative of the electronic gift card to the recipient mobile communication device as a text based message.

6. The method of claim 5, wherein the action of presenting one or more selectable indicia further comprises presenting the selectable indicia on a screen of the text messaging application such that a user can select an indicia to automatically cause the gift card to be associated with a merchant identified in the indicia.

7. The method of claim 5, wherein the action of presenting one or more selectable indicia further comprises parsing the textual content of the text message to identify triggers to use as search criteria for identifying the indicia for particular gift cards to present.

8. The method of claim 5, further comprising the action of presenting an interface to enable a user to select an interval for resending of the gift card at the selected interval of time.

9. The method of claim 5, further comprising the action of providing an interface for a user to select parameters for a subscription to be included in the text message.

10. The method of claim 5, further comprising the action of providing an interface for a user to select parameters for a subscription, wherein the parameters comprise a value, an identification of a merchant and a duration.

11. A smart phone including a messaging application configured to perform the following actions:
 presenting a window for the entering, transmission, receiving and display of messages between a sender and a recipient;
 during the process of creating a text message, displaying one or more indicia an interface within an interface of the messaging application, with each indicia being associated with a merchant for which an electronic gift card be sent to the recipient;
 receiving a selection of a particular indicia for the selection of an electronic gift card for a particular merchant;
 receiving the selection of a value to be associated with the electronic gift card;
 embedding a graphic into the text message, wherein the graphic indicates the reception of an electronic gift card and includes a value and a machine code that can be scanned;
 transmitting the text message with the embedded electronic gift card to the recipient.

12. The smart phone messaging application of claim 11, wherein the action of displaying one or more indicia further comprises parsing the text message to identify triggers and using the triggers to search for merchants that have a relationship to the triggers and displaying triggers for such merchants.

13. The smart phone messaging application of claim 12, wherein the action of displaying one or more indicia further comprises displaying the indicia on a screen of the text messaging application such that a user can select an indicia to automatically cause the gift card to be associated with a merchant identified in the indicia.

14. The smart phone messaging application of claim 11, wherein the action of displaying one or more indicia further comprises displaying the indicia on a screen of the text messaging application such that a user can select an indicia to automatically cause the gift card to be associated with a merchant identified in the indicia.

15. The smart phone messaging application of claim 11, wherein the action of displaying one or more indicia further comprises displaying the indicia in the text messaging application such that a user can select an indicia to automatically cause the gift card to be associated with a merchant identified in the indicia.

* * * * *